United States Patent
Logan et al.

(10) Patent No.: US 7,926,397 B2
(45) Date of Patent: *Apr. 19, 2011

(54) PORTABLE SAW TABLE ASSEMBLY

(75) Inventors: J. Richard Logan, Oxford, MI (US);
Clyde G. Allen, Columbiaville, MI (US);
Michael C. Clark, Columbiaville, MI (US)

(73) Assignee: Tapco International Corporation, Wixom, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/498,873

(22) Filed: Jul. 7, 2009

(65) Prior Publication Data

US 2009/0266215 A1    Oct. 29, 2009

Related U.S. Application Data

(63) Continuation of application No. 10/448,679, filed on May 30, 2003, now Pat. No. 7,555,976.

(60) Provisional application No. 60/384,298, filed on May 30, 2002.

(51) Int. Cl.
*B23D 33/02* (2006.01)

(52) U.S. Cl. ....... 83/471; 83/471.1; 83/471.3; 83/486.1; 83/859

(58) Field of Classification Search ........... 83/928, 83/701, 859, 471, 471.1, 471.3, 486.1, 468.3, 83/522.18; 144/287, 286.1, 286.5; 33/443
See application file for complete search history.

(56) References Cited

U.S. PATENT DOCUMENTS

| | | | |
|---|---|---|---|
| 3,352,334 A | 11/1967 | Hunn | |
| 3,565,139 A | 2/1971 | Olson | |
| 3,727,502 A | 4/1973 | Steinman | |
| 3,830,128 A | 8/1974 | Cochran et al. | |
| 3,866,496 A | 2/1975 | Payne et al. | |
| 3,955,456 A | 5/1976 | Van Cleave | |
| 4,078,460 A | 3/1978 | Bowman | |
| 4,133,237 A | 1/1979 | Lewin | |
| 4,197,775 A | 4/1980 | Handler et al. | |
| 4,281,572 A | 8/1981 | Stovall | |
| 4,354,410 A | 10/1982 | Stubbings | |

(Continued)

FOREIGN PATENT DOCUMENTS

WO    98/50205 A1    11/1998

*Primary Examiner* — Boyer D Ashley
*Assistant Examiner* — Omar Flores-Sánchez
(74) *Attorney, Agent, or Firm* — Howard & Howard Attorneys PLLC

(57) ABSTRACT

The subject invention provides a portable saw table assembly for cutting a material longitudinally, laterally, and at various angles thereto. The assembly includes a first and a second table rail being parallel and spaced from each other and each extending between a proximal end and a distal end. A saw rail is moveably supported by the first and the second table rails for moving longitudinally along the table rails between the proximal and the distal ends and a mounting plate is moveably supported by the saw rails to allow movement of the mounting plate laterally along the saw rail between the first table rail and the second table rail. A saw plate is rotateably supported by the mounting plate for carrying a saw to cut the material. A guide bar is disposed diagonally relative to the first and the second table rails and engages the saw plate to guide the saw plate diagonally in response to simultaneous movement of the saw rail longitudinally and the mounting plate laterally.

22 Claims, 10 Drawing Sheets

U.S. PATENT DOCUMENTS

| | | |
|---|---|---|
| 4,378,716 A | 4/1983 | Volk |
| 4,516,453 A | 5/1985 | Parham, Jr. |
| 4,630,657 A | 12/1986 | Obradovich |
| 4,802,399 A | 2/1989 | Olson |
| 4,807,506 A | 2/1989 | Audet |
| 4,867,023 A | 9/1989 | Kozyrski et al. |
| 4,877,069 A | 10/1989 | Plumley |
| 4,920,845 A | 5/1990 | Blanchette |
| 5,038,650 A | 8/1991 | Hodge |
| 5,107,736 A | 4/1992 | Albrecht |
| 5,253,400 A | 10/1993 | Conachen |
| 5,404,779 A | 4/1995 | Break |
| 5,421,231 A | 6/1995 | Break et al. |
| 5,442,984 A | 8/1995 | Tate |
| 5,868,054 A | 2/1999 | Chubb et al. |
| 6,470,780 B1 * | 10/2002 | Benuzzi .......... 83/733 |
| 6,691,972 B1 * | 2/2004 | Oliver .......... 248/441.1 |
| 6,705,192 B2 | 3/2004 | Logan |
| 7,165,334 B2 * | 1/2007 | Ben-Gigi .......... 33/485 |
| 7,493,686 B2 * | 2/2009 | Barford .......... 29/560 |
| 2002/0179181 A1 | 12/2002 | Murphy |

* cited by examiner

PORTABLE SAW TABLE ASSEMBLY

RELATED APPLICATIONS

This application is a Continuation of U.S patent application Ser. No. 10/448,679 filed on May 30, 2003, now U.S. Pat. No. 7,555,976 which claims priority to U.S. Provisional Patent Application No. 60/384,298, which was filed on May 30, 2002.

BACKGROUND OF THE INVENTION

1. Field of the Invention

The subject invention relates to a portable saw table assembly for cutting a material longitudinally, laterally, and at various angles thereto.

2. Description of the Related Art

Various portable saw table assemblies for cutting a material longitudinally, laterally, and at various angles thereto are known to those skilled in the art. The assemblies typically include a first table rail and a second table rail being parallel and spaced from each other and each extending between a proximal end and a distal end. A saw rail is moveably supported by the first and the second table rails for moving longitudinally along the table rails between the proximal and the distal ends and a mounting plate is moveably supported by the saw rail to move the mounting plate between the first table rail and the second table rail. The assemblies also include a saw plate rotateably supported by the mounting plate for carrying a saw to cut the material. The saws are typically attached to long arms that pivot to cut various angles into the material.

One such assembly is shown in U.S. Pat. No. 4,516,453 to Parham, Jr. The '453 patent discloses a saw table assembly having a table rail slideably receiving a first end of a saw carriage. The other end of the saw carriage is rotateably fixed to the table assembly to allow the saw carriage to pivot to cut a material at various angles. When the saw carriage is pivoted, the first end slides within the table rail. Bolts secure the first end to the table rail to prevent the saw carriage from shifting while cutting the material. Since the saw rails have to be long enough to extend along the diagonal, the saw rails may flex when cutting the material. The flexing of the saw rails produces inaccurate cuts in the material. The saw rails also lose their rigidity causing the saw to rock from side to side thereby producing inaccurate cuts. Also, the saw rails project over the edges of the table making the saw awkward to use.

Another assembly shown in U.S. Pat. No. 4,802,399 to Olson discloses a saw table assembly having a first and a second table rails supporting a pair of saw rails. The saw rails support a saw carriage for cutting a material. The saw rails are fixed to the table rails to prevent longitudinal movement of the saw carriage. The saw carriage moves laterally along the saw rails to cut the material. The saw carriage is rotateable between a lateral position and a longitudinal position to cut the material. Since the saw rails are fixed to the table rails, in order to produce a longitudinal cut, the '399 patent utilizes rollers mounted on the second table rail such that the material moves longitudinally while the saw remains fixed. The table assembly can only cut the material longitudinally and laterally and not diagonally.

Yet another assembly shown in U.S. Pat. No. 3,866,496 to Payne et al. discloses a saw table assembly capable of cutting material diagonally. The saw table assembly includes a first and a second table rail moveably supporting a pair of saw rails. The saw rails also moveably support a saw carriage for moving between the table rails to cut the material laterally. The saw carriage includes a saw plate that is rotateable for rotating a saw between lateral and longitudinal. The saw rails connect to the table rails with support plates, which can be positioned along the table rails for cutting the material diagonally. To cut the material diagonally, the support plates are positioned at their respective positions and locked in place. This aligns the saw at the desired angle with the saw rails being diagonal and the saw is moved along the saw rails to produce the diagonal cut. However, one disadvantage of such an assembly is that the support plates must be aligned each time a different angle cut is desired. After cutting the first angle, each of the support plates is then moved to another position to cut a different angle. Also, since the saw is carried by the saw rails and the saw rails must be long enough to extend along the diagonal, the saw rails may flex when cutting the material. If the saw rails are made of a stronger material to prevent flexing, then the saw table assembly becomes heavier and makes it less portable. Also, the saw rails project over the edges of the table making the saw awkward to use.

The related art assemblies are characterized by one or more inadequacies. Accordingly, it would be advantageous to provide a saw table assembly that is lightweight, portable, and convenient to use for precisely and accurately cutting material at various angles.

BRIEF SUMMARY OF THE INVENTION AND ADVANTAGES

The subject invention provides a portable saw table assembly for cutting a material longitudinally, laterally, and at various angles thereto. The assembly includes a first table rail and a second table rail being parallel and spaced from each other and each extending between a proximal end and a distal end. A saw rail is moveably supported by the first and the second table rails and disposed perpendicular to the first and the second table rails for moving longitudinally along the table rails between the proximal and the distal ends. The saw rail moveably supports a mounting plate such that the mounting plate moves laterally along the saw rail between the first table rail and the second table rail. A saw plate is rotateably supported by the mounting plate for carrying a saw to cut the material. The assembly further includes a guide bar disposed diagonally relative to the first and the second table rails and engaging the saw plate to guide the saw plate diagonally in response to simultaneous movement of the saw rail longitudinally and the mounting plate laterally.

The subject invention overcomes the inadequacies that characterize the related art assemblies. Specifically, the subject invention allows the material to be precisely cut at various angles. Since the saw rails do not have to extend along a diagonal, the saw rails do not flex thereby producing a more accurate cut. Also, the assembly is more convenient for use since the saw rails to extend from the table as does the related art assemblies. Further, the guide bar is moveable between predetermined angles, or pitches, to allow for quick and efficient cutting of the material. The subject invention can also be operated by a single user because it is lightweight and portable.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
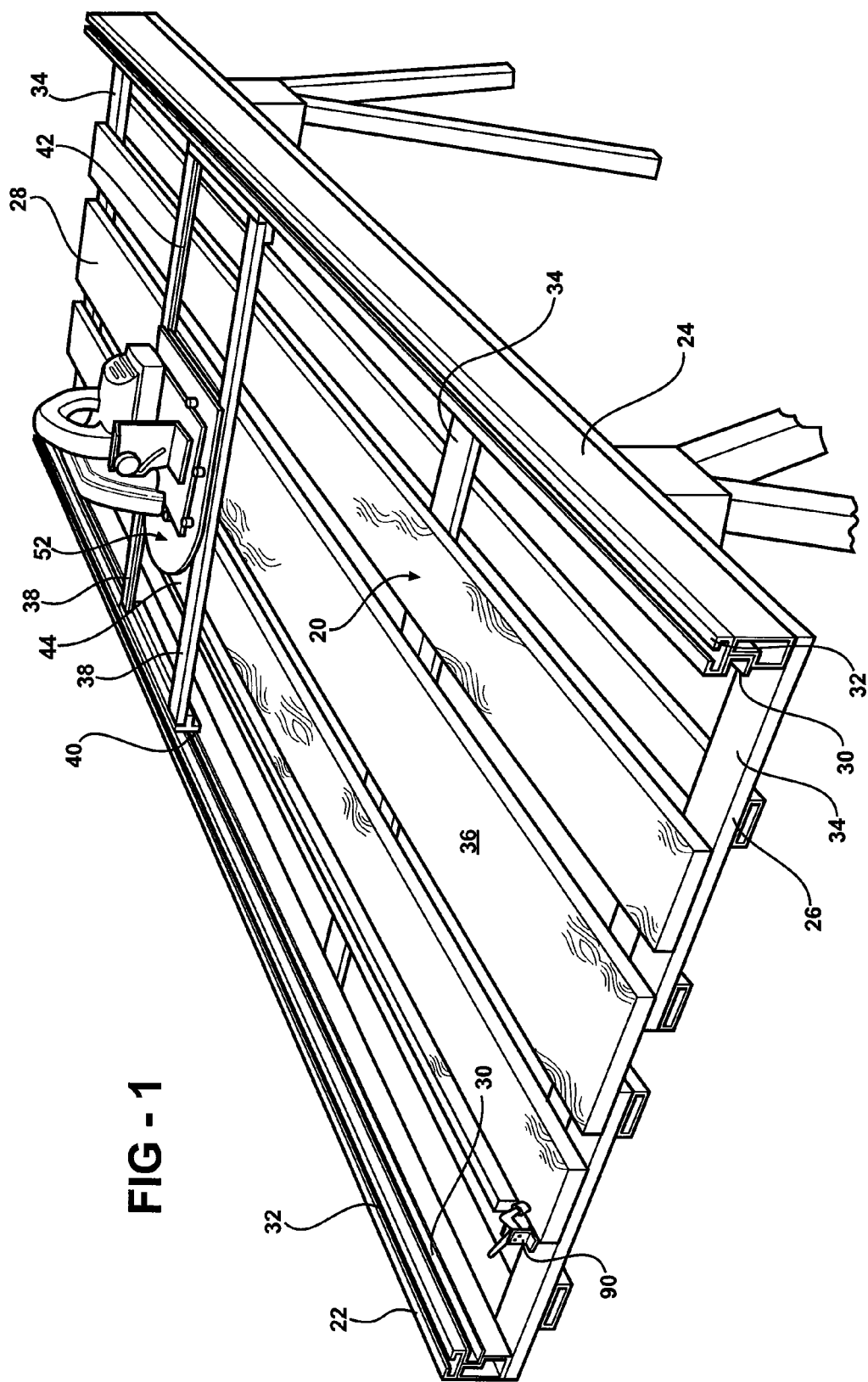
FIG. 1 is a perspective view of a saw table assembly according to the subject invention.

Referring to the Figures, wherein like numerals indicate like or corresponding parts throughout the several views, a portable saw table assembly for cutting a material longitudinally, laterally, and at various angles thereto is shown generally at 20 in FIG. 1. The saw table assembly 20 is particularly useful for cutting siding materials for buildings, such as vinyl siding. However, it would be equally useful for cutting other materials, such as wood. The saw table assembly 20 may be formed of any type of material capable of supporting the material to be cut, but is preferably aluminum to allow for easy transportation. Other metals may also be used so long as the assembly 20 is lightweight and portable.

The assembly 20 includes a first table rail 22 and a second table rail 24 being parallel and spaced from each other and each extending between a proximal end 26 and a distal end 28. The first and the second table rails 22, 24 are preferably C-shaped to define a channel 30 extending longitudinally along the length of each of the first table rail 22 and the second table rail 24 and also defines a slot 32. A lateral support 34 extends between the first table rail 22 and the second table rail 24 forming a table surface 36 for supporting the material to be cut. As illustrated in the figures, a plurality of lateral supports 34 extend between the first and the second table rails 22, 24. The table surface 36 may be formed from plywood supported on the lateral supports 34 and extending from the proximal end 26 to the distal end 28.

A saw rail 38 is moveably supported by the first and the second table rails 22, 24 for moving longitudinally along the table rails 22, 24 between the proximal and the distal ends 26, 28. Preferably, a pair of saw rails 38 extend perpendicularly between the first and the second table rails 22, 24. The saw rails 38 engage the channel 30 in the first and the second table rails 22, 24 to slide longitudinally. In order to slide, the saw rails 38 may include wheels, bearings, or the like 40 for allowing fluid movement of the saw rails 38 in the channels 30. However, it is to be appreciated that the saw rails 38 may slide without any wheels, bearings, or the like 40 by being sized precisely to fit within the channels 30 to allow movement. The saw rails 38 are therefore able to slide the entire length of the table assembly 20 from the proximal end 26 to the distal end 28. The saw rails 38 may be removed from the first and the second table rails 22, 24 at either of the proximal or distal ends 26, 28 by sliding out the saw rails 38 from the channels 30.

Figure 2:
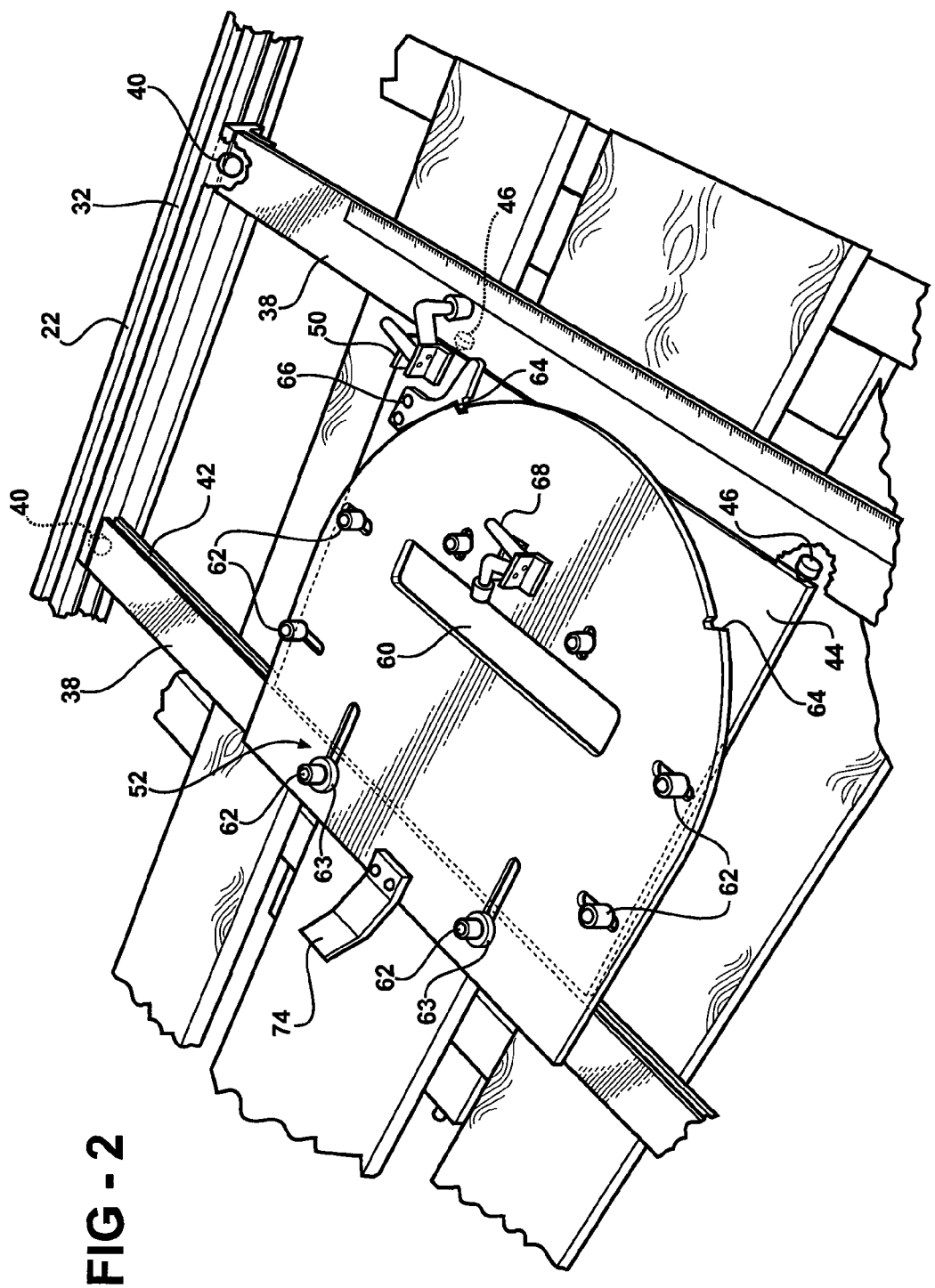
FIG. 2 is a perspective view of a pair of saw rails extending between a first and a second table rails having a mounting plate supported by the saw rails and a saw plate supported by the mounting plate without a saw mounted to the saw plate.

Referring to FIG. 2, each of the saw rails 38 also define a channel 42 for moveably supporting a mounting plate 44 to allow movement of the mounting plate 44 laterally along the saw rail 38 between the first table rail 22 and the second table rail 24. Preferably, the mounting plate 44 is slideably received within the channels 42 of the saw rails 38. The mounting plate 44 is then able to slide the width of the table between the first table rail 22 and the second table rail 24. The mounting plate 44 may also include wheels, bearings, or the like 46 for sliding within the rails. The mounting plate 44 is generally rectangular shaped and extends between the saw rails 38. The mounting plate 44 has an opening for allowing the saw to extend there through to cut the material.

A plate clamp 50 extends from the mounting plate 44 for engaging at least one of the saw rails 38 for fixing the position of the mounting plate 44 between the first table rail 22 and the second table rail 24. The plate clamp 50 locks the mounting plate 44 to prevent lateral motion of the mounting plate 44 while moving the saw rails 38 longitudinally. When the plate clamp 50 is disengaged, the mounting plate 44 slides freely within the saw rails 38.

Figure 3:
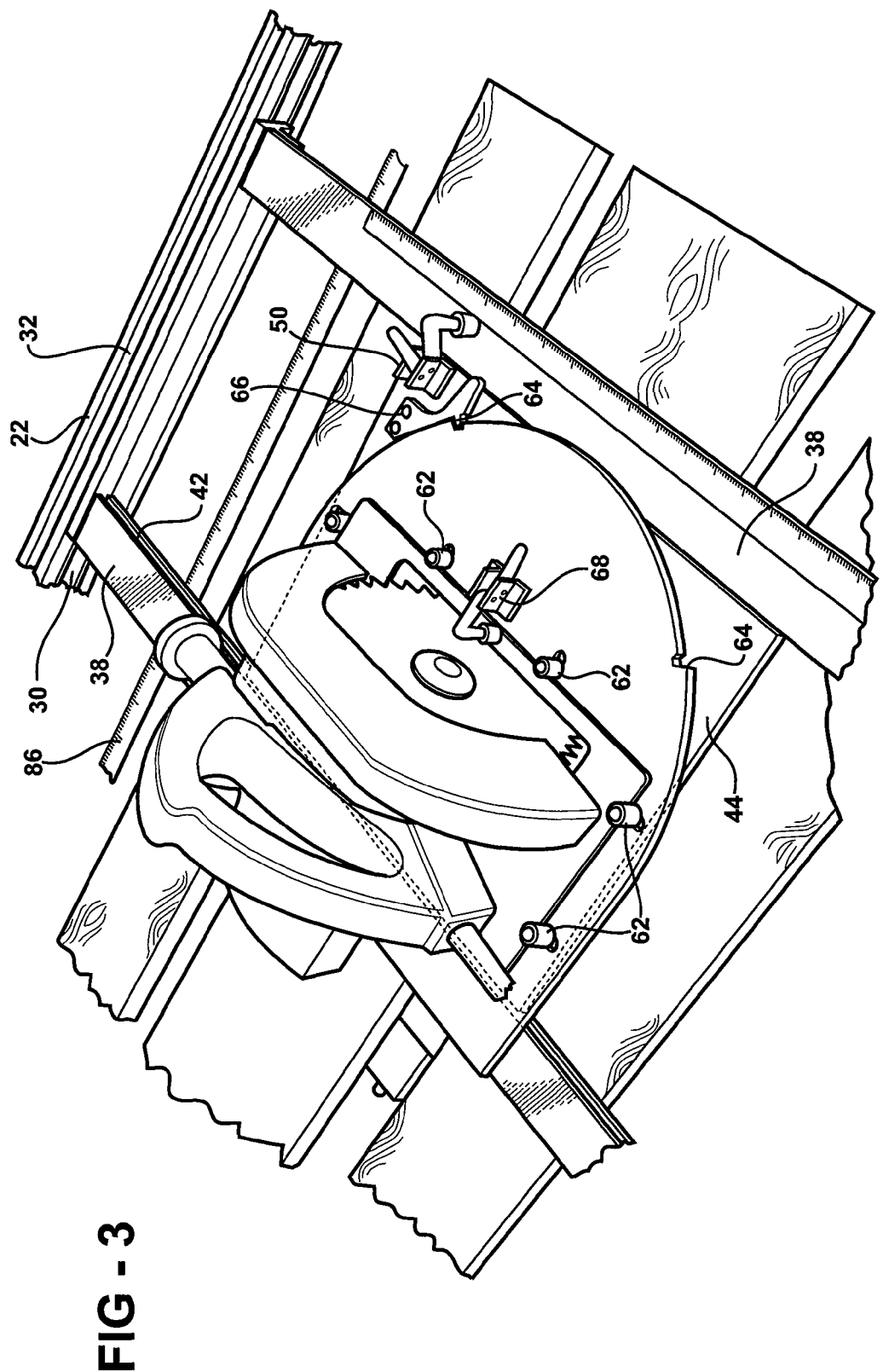
FIG. 3 is a perspective view of a saw mounted to the saw plate in a lateral direction for cutting the material laterally.
Figure 4:
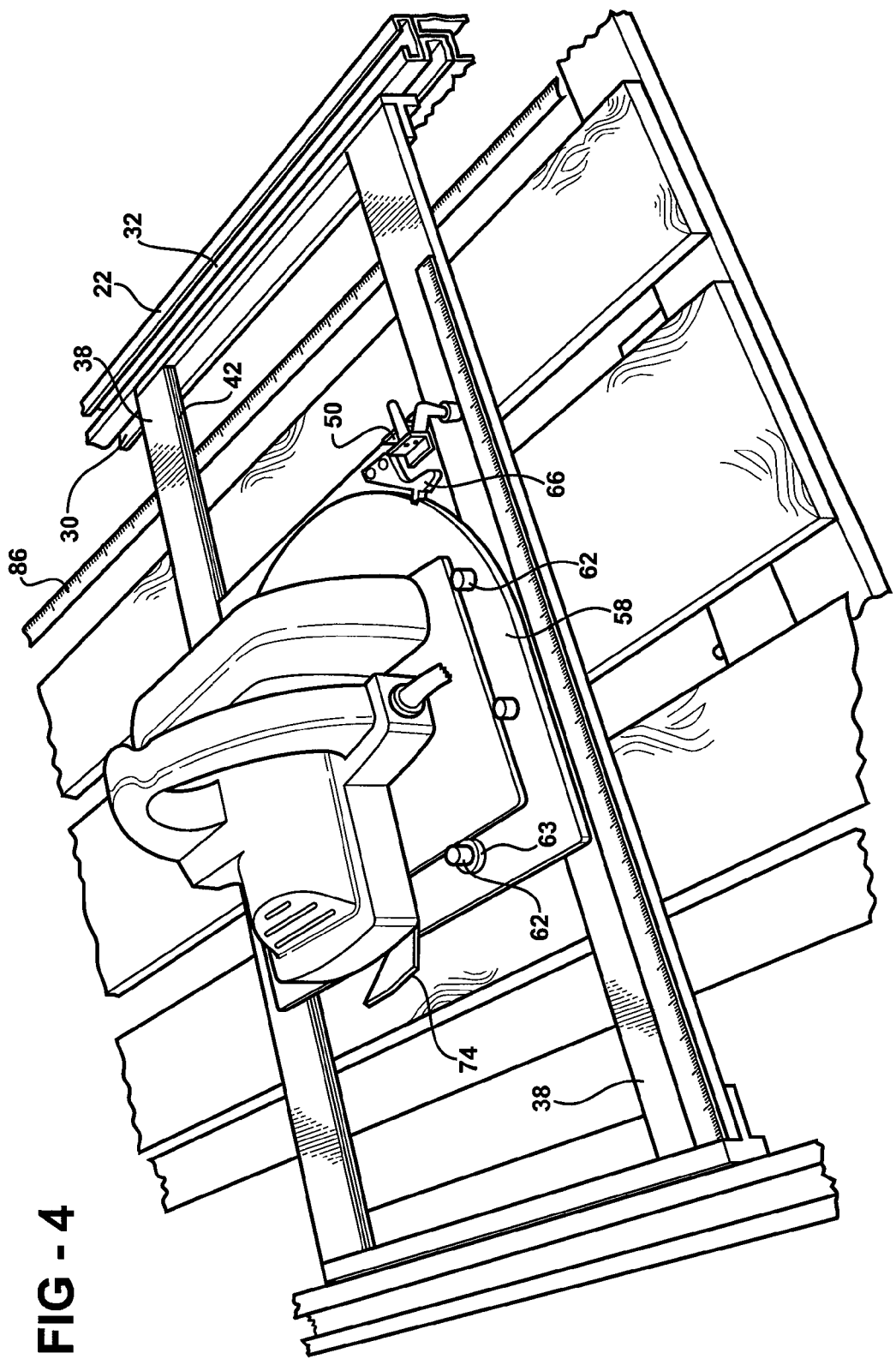
FIG. 4 is a perspective view of the saw mounted to the saw plate in a longitudinal direction for cutting the materially longitudinally.

The subject invention further includes a saw plate 52 rotateably supported by the mounting plate 44 for carrying a saw to cut the material, as shown in FIGS. 3 and 4. The saw that is preferably used with the table assembly 20 is a hand saw having a saw guide as is known in the art of saws. The saw plate 52 defines an aperture 60 through which a blade of the saw extends. A plurality of plate locks 62 extend into the saw plate 52 for securing the saw thereto. The plate locks 62 may include a lip 63 that engages the saw guide of the saw to provide additional support for securing the saw to the saw plate 52. To mount the saw to the saw plate 52, the plate locks 62 are slide open and the saw is positioned therein. The plate locks 62 are then slide into engagement with the saw guide to secure the saw to the saw plate 52. The lips 63 of the plate locks 62 also engage the saw guide. Each of the plate locks 62 may be locked in the position to prevent the saw from moving.

The saw plate 52 has a plurality of detents 64 which correspond to a predetermined angle, or pitch, for cutting the material. The saw plate 52 may rotate on the mounting plate 44 on bearings or the like (not shown). A latch mechanism 66 is mounted to the mounting plate 44 to secure the saw plate 52 at the angle and to prevent the saw plate 52 from rotating. The latch mechanism 66 engages the detent 64 to fix the position of the saw at the predetermined angle. As shown in FIG. 3, the saw plate 52 is positioned such that the material is cut at a ninety degree angle with respect to the first table rail 22 by moving the mounting plate 44 laterally. Whereas in FIG. 4, the saw plate 52 is positioned such that the material is cut at a one hundred and eighty degree angle with respect to the first table rail 22 by moving the saw rails 38 longitudinally.

A saw clamp 68 may also be mounted to the saw plate 52 for securing the saw to the saw plate 52. Once the plate locks 62 have been positioned to fit the saw, the saw is positioned on the saw plate 52. The saw clamp 68 is then locked into place to secure the saw. The plate locks 62 include the lip 63 engaging the saw guide. The saw clamp 68 and plate locks 62 allow for efficient removal of the saw from the saw plate 52.

Further, only some of the plate locks 62 may engage the saw guide of the saw, while the others only position the saw to the saw plate 52.

Figure 5:
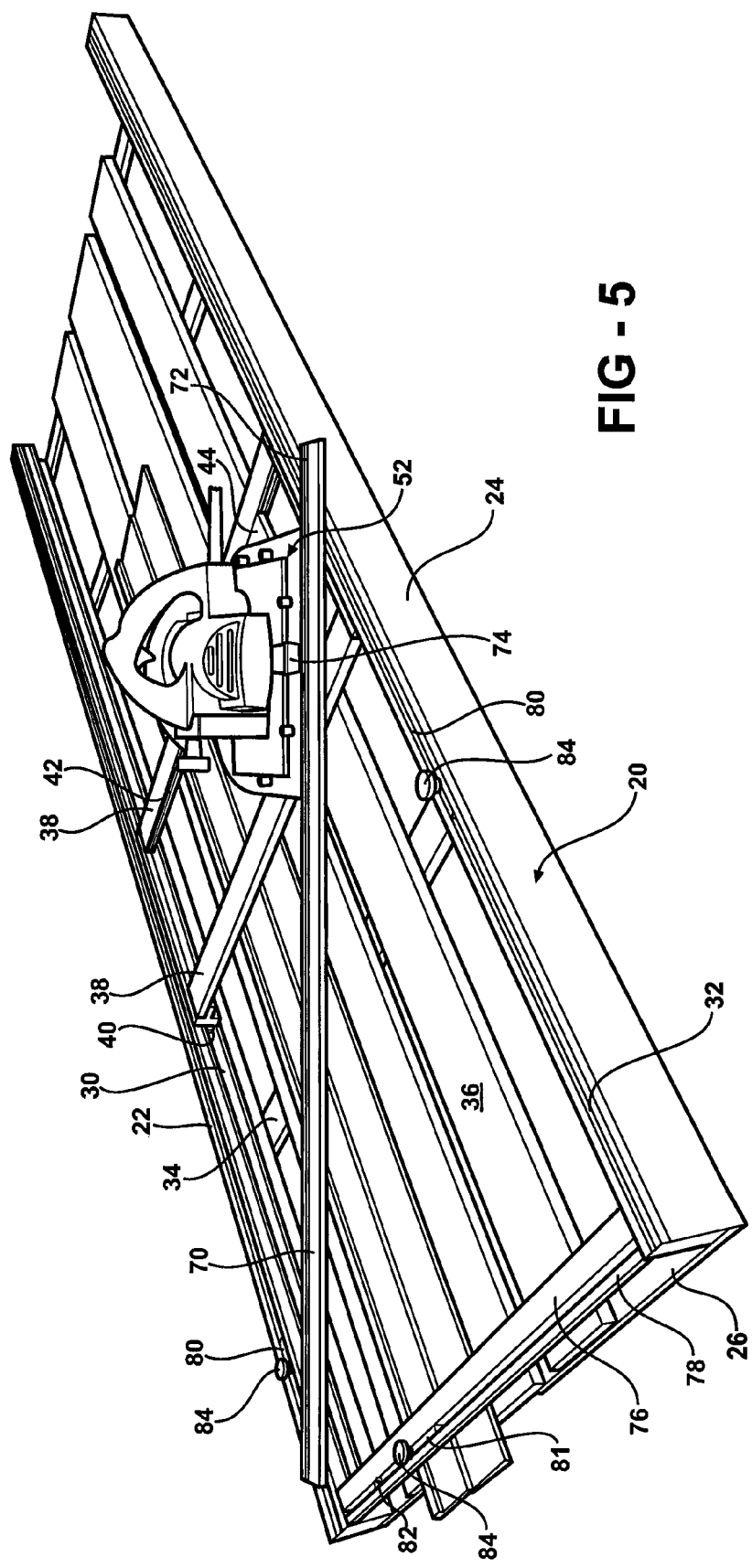
FIG. 5 is a perspective view of the saw table assembly having a guide bar extending between the first table rail and the second rail for cutting a material on an angle.

Referring to FIG. 5, a guide bar 70 is disposed diagonally relative to the first and the second table rails 22, 24 and engages the saw plate 52 to guide the saw plate 52 diagonally in response to simultaneous movement of the saw rail 38 longitudinally and the mounting plate 44 laterally. In one embodiment, the guide bar 70 defines a groove 72 for engaging the saw plate 52. The angle rail 76 may be conveniently stored telescopically in one of the longitudinal supports or the rails. The saw plate 52 includes a connector 74 for engaging the groove 72 of the guide bar 70 to move the saw plate 52 diagonally. The latch mechanism 66 may only secure the saw plate 52 in the 180 degree position and the 90 degree position, while the connector 74 and the guide bar secure the saw in the angles therebetween.

Figure 6:
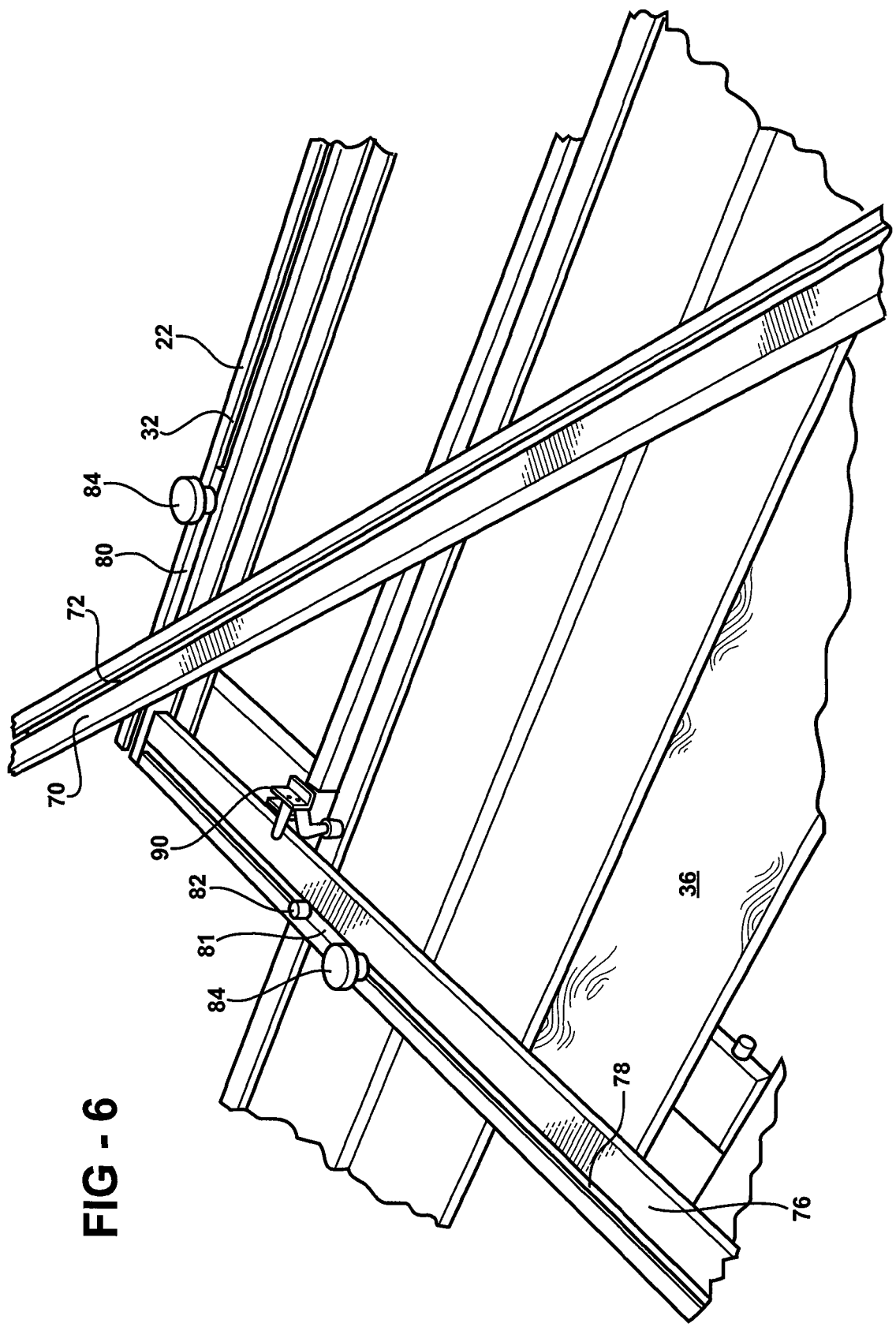
FIG. 6 is a perspective, close-up view of the guide bar being supported by the first table rail and an angle rail having a bar locator therein.
Figure 7:
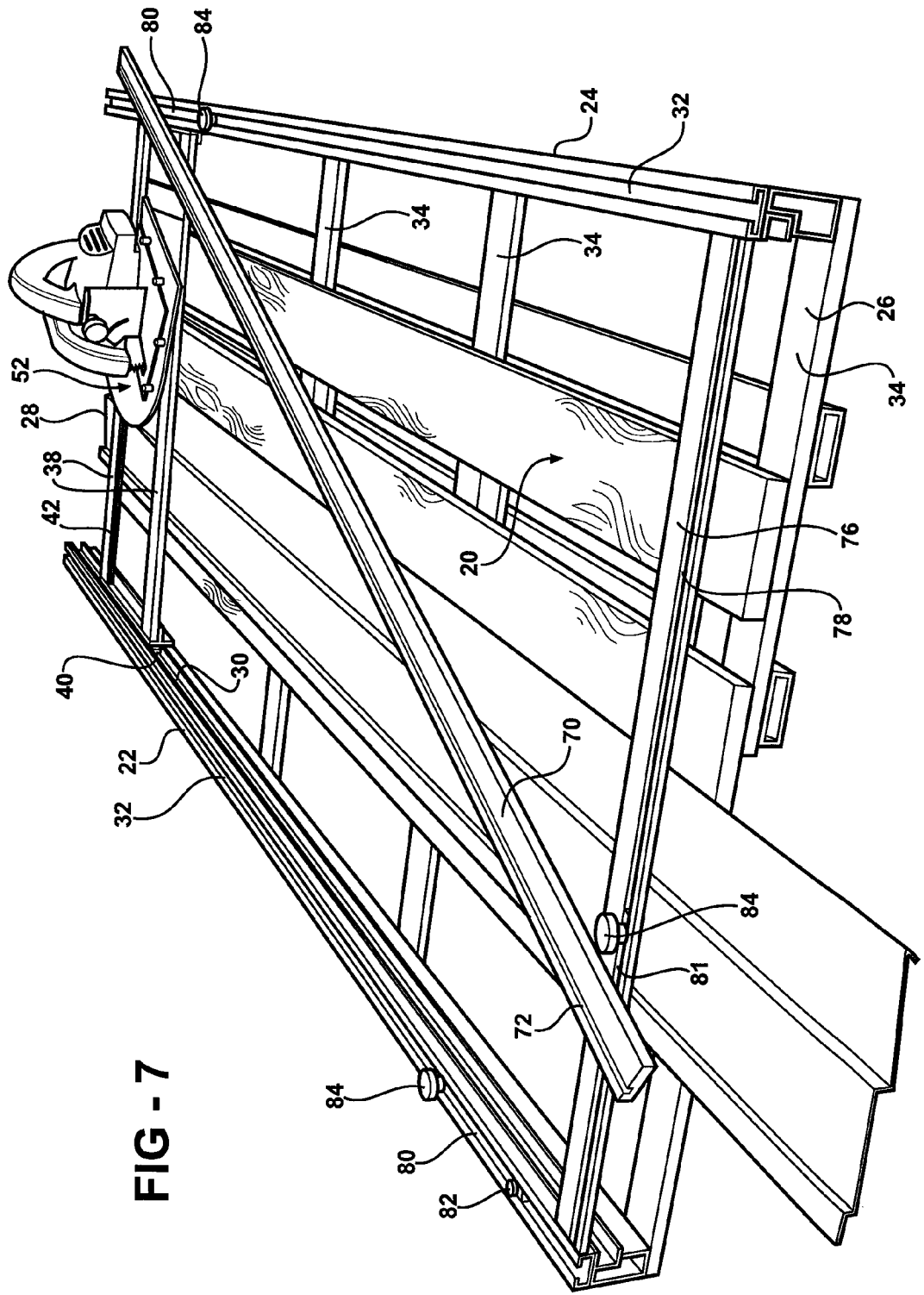
FIG. 7 is a perspective view of the guide bar supported by the angle rail and the second table rail.

When cutting the material at certain angles, or pitches, an angle rail 76 may be required, as shown in FIGS. 6 & 7. The angle rail 76 is supported by and extends between the first and the second table rails 22, 24 for supporting the guide bar 70 at various angles. Preferably, the angle rail 76 also defines a slot 78, for use as described below. When the guide bar 70 is positioned on only the first and the second table rails 22, 24, only certain pitches may be achieved. Therefore, by using the angle rail 76, various other pitches may be obtained.

In order to position the guide bar 70 diagonally and to prevent the guide bar 70 from moving while cutting diagonally, a bar locator 80 is supported by one of the first and the second table rails 22, 24 and engages the guide bar 70. The bar locator 80 is moveable within the first and the second table rail 24. Depending upon the desired pitch of the material, the bar locator 80 slides to position the guide bar 70 at various angles between a lateral direction and a longitudinal direction. Preferably, the subject invention incorporates a pair of bar locators 80 engaging each of the first and the second table rails 22, 24. Utilizing more than one bar locator 80 provides more accurate cuts; however, the subject invention may use none, one, or more than two. For pitches between 4/12 and 12/12, one bar locator 80 is positioned on the first table rail 22 and the other is on the second table rail 24. For pitches less than 4/12, one of the bar locators 80 engages one of the first and the second table rails 22, 24 and the other of the bar locators 80 engages the angle rail 76. Alternately, the subject invention may include a third bar locator 81 engaging the angle rail 76 such that the guide bar 70 engages one of the pair of bar locators 80 and the third bar locator 81, without having to remove one from the first or the second table rails 22, 24. It is to be understood that these pitches may be varied by modifying the size or shape of the table without deviating from the subject invention.

Each of the bar locators 80, 81 may include posts 82 extending upwardly from the bar locators 80, 81 for engaging and positioning the guide bar 70 at various angles. A locking mechanism 84 engages each of the bar locators 80, 81 for locking the bar locators 80, 81 in the slots 32, 78 of the first and the second table rail 24 and the angle rail 76, respectively. In order to precisely and quickly change the position of the bar locators 80, 81, angle indicators 83 are present on at least one of the first and the second table rails 22, 24, the saw rail 32, and the angle rail 76. The bar locators 80, 81 are moved to the desired angle indicators 83 and locked into place by the locking mechanism 84. The guide bar 70 pivots about the posts 82 to change the angle of the cut in the material. The guide bar 70, when not being used, may be conveniently stored telescopically in one of the rails or longitudinal supports.

Figure 8:
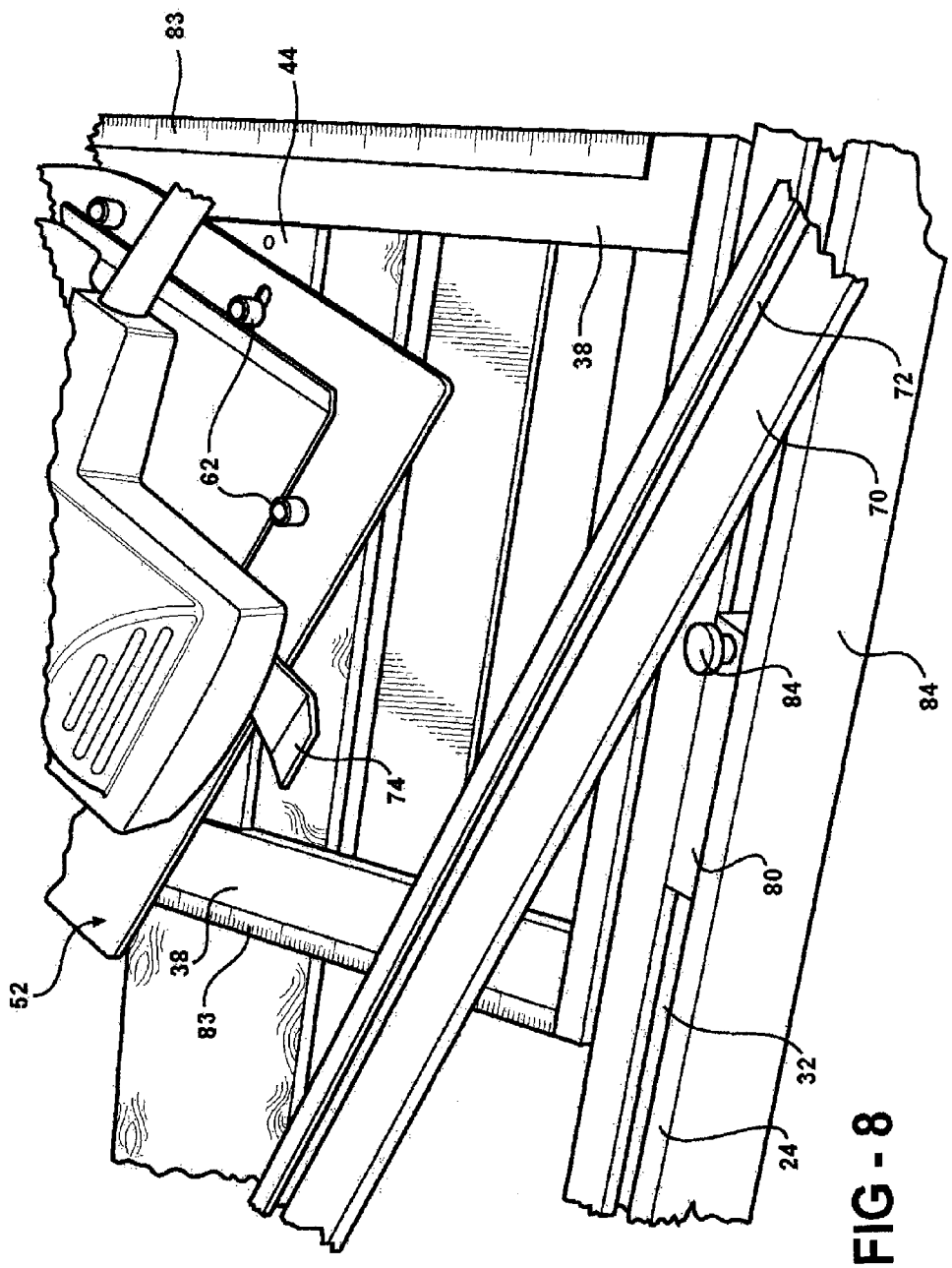
FIG. 8 is a perspective view of a connector supported by a saw plate for engaging the guide bar to guide the saw plate diagonally.

The connector 74, shown in FIG. 8, may be supported on the saw plate 52 for being received in the groove 72 of the guide bar 70 to guide the saw as it moves along the guide bar 70. After the guide bar 70 has been positioned, the connector 74 is connected to the guide bar 70. As the mounting plate 44 is moved laterally and the saw rails 38 are moved longitudinally, the connector 74 follows along the guide bar 70 to achieve the desired pitch in the material. Since the saw is being carried by the mounting plate 44, the first and the second table rails 22, 24, and guided by the guide bar 70, there is little or no flexing of the saw rails 38 to produce inaccurate cuts.

In operation, the user positions one bar locator 80, 81 and then the other bar locator 80, 81 in the respective slots 32, 78, as described above, and locks the locking mechanism 84 so that the bar locators 80, 81 do not move. Next, one end of the guide bar 70 is mounted onto one of the bar locators 80, 81 such that the post 82 engages the guide bar 70. The other end of the guide bar 70 is then moved into engagement with the other bar locator 80, 81 such that the post 82 engages the guide bar 70. The guide bar 70 may engage the bar locators 80, 81 by other means other than the posts 82 described, such as clamps or screws, without deviating from the subject invention.

Figure 9:
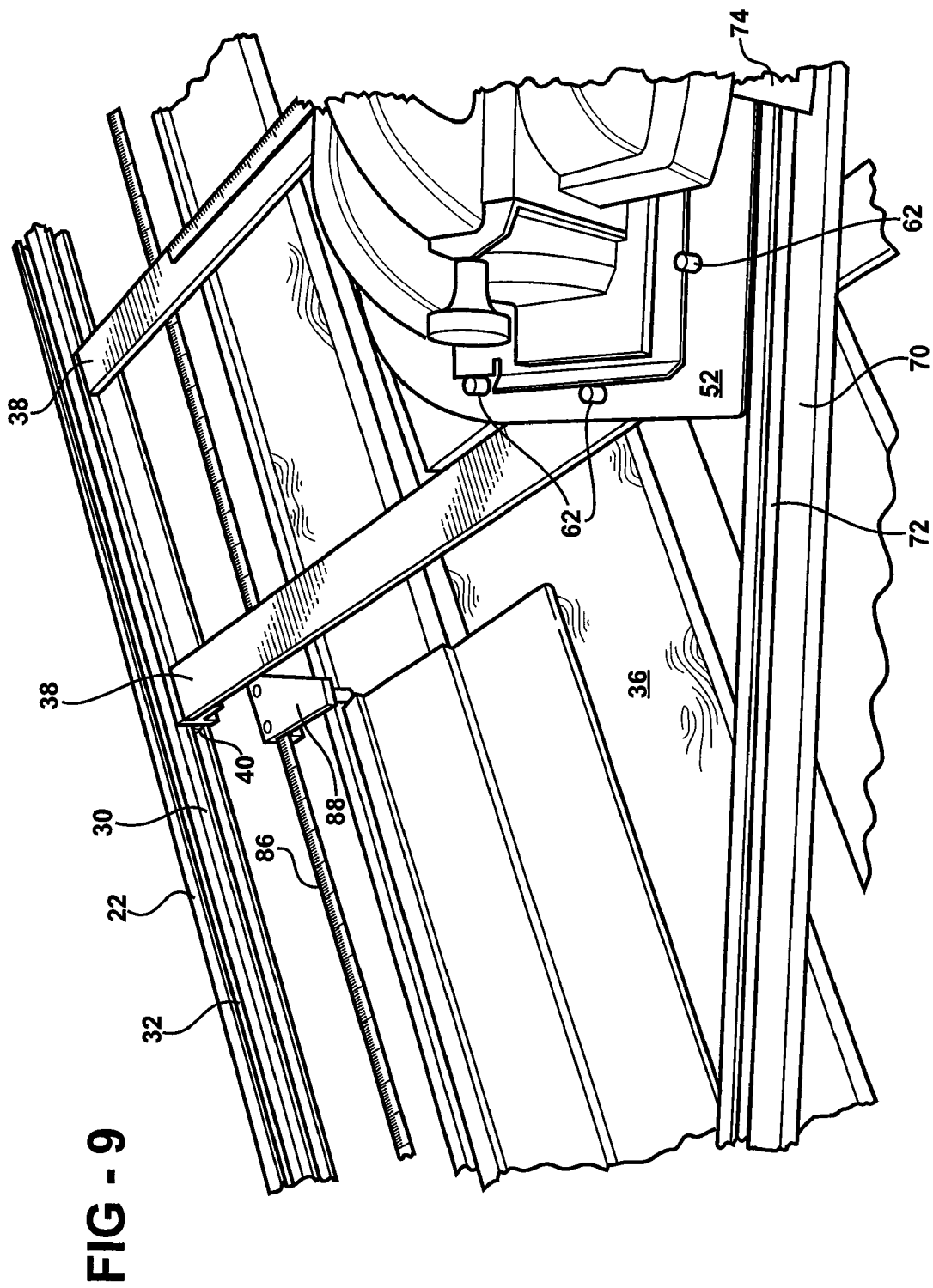
FIG. 9 is a perspective view of a material stop supported by the first table rail for positioning the material to produce accurate cuts.

Referring to FIG. 9, after the guide bar 70 is positioned, the saw plate 52 is rotated so that the connector 74 contacts the groove 72 of the guide bar 70. In order to follow the angle of the guide bar 70, the mounting plate 44 and the saw rails 38 simultaneously slide in their respective channels 30, 42 to form the angled cut.

A measuring rod 86 may be supported on the first and the second table rails 22, 24 and extends between the proximal and distal ends 26, 28. A material stop 88 may be slideably carried on the measuring rod 86 such that the material stop 88 is moved along the measuring rod 86 to allow the material to be cut having a predetermined length that is indicated on the measuring rod 86 itself. The material stop 88 may be locked to the measuring rod 86 to prevent further movement when cutting the material. The material stop 88 can be rotated between a stopping position and a free position. In the stopping position, the material stop 88 engages the material and prevents the material from moving longitudinally along the cutting surface. The material stop 88 is then rotated upwardly away from the table surface 36 to the free position that allows the material to move along the entire length. The rotating of the material stop 88 may be accomplished by rotating about the measuring rod 86 or by rotating the measuring rod 86. The subject invention may also include material clamps 90 for securing the material to the table surface 36 as is known in the art of clamps.

Figure 10:
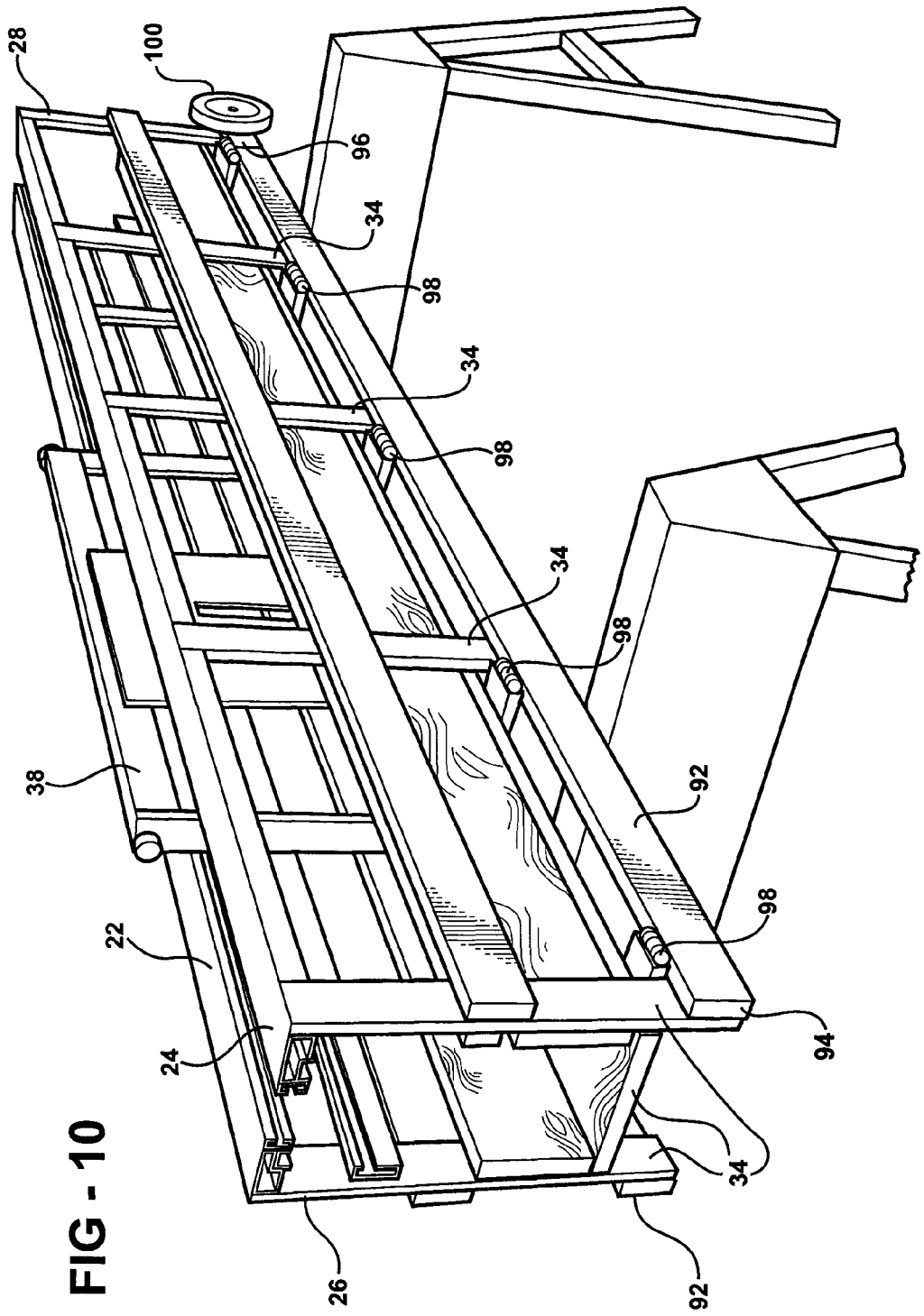
FIG. 10 is a perspective view of the saw table assembly being folded into a portable position.

As illustrated in FIG. 10, the subject invention also provides the saw table assembly 20 being portable and convenient for use by a single user. In order to be portable, the first table rail 22 and the second table rail 24 are pivotable relative to one another such that the table assembly 20 is foldable. A pair of central rails 92 having proximal and distal ends 94, 96 extend parallel to and spaced from the first and the second table rails 22, 24. The pair of central rails 92 engage the lateral supports 34 to form the table surface 36. A hinge mechanism 98 connects the lateral supports 34 to the central rails 92 for allowing the first and the second table rails 22, 24 to pivot about the central rails 92. The lateral supports 34 preferably extend between the central rails 92 and between the central rails 92 and the first and the second table rails 22, 24 to form the table surface 36.

In order to fold the first and the second table rails 22, 24, the saw rails 38 are removed from the first and the second table rails 22, 24. The saw rails 38 can then be locked into the folded table and used as a handle. A pair of wheels 100 engages the central rails 92 for moving the table assembly 20 when the first and the second table rails 22, 24 are pivoted about the central rails 92. When the table is unfolded, the wheels 100 are below the cutting surface and are out of the way of the cutting operation. The table assembly 20 may also include a base (not shown) and foldable legs (not shown) for supporting the saw table assembly 20.

Obviously, many modifications and variations of the present invention are possible in light of the above teachings. The invention may be practiced otherwise than as specifically described within the scope of the appended claims.

What is claimed is:

1. A portable saw table assembly for cutting a material longitudinally, laterally, and at various angles thereto, said assembly comprising:
   a first table rail and a second table rail being parallel and spaced from each other and each extending between a proximal end and a distal end;
   a saw rail moveably supported by said first and said second table rails for moving longitudinally along said table rails between said proximal and said distal ends;
   a mounting plate moveably supported by said saw rail to move said mounting plate laterally along said saw rail between said first table rail and said second table rail;
   a saw plate rotateably supported by said mounting plate for carrying a saw to cut the material;
   a guide bar disposed diagonally relative to said first and said second table rails and engaging said saw plate to guide said saw plate diagonally in response to simultaneous movement of said saw rail longitudinally and said mounting plate laterally;
   a bar locator supported by and slideable along one of said first and second table rails and engaging said guide bar to position said guide bar diagonally;
   wherein said bar locator is moveable along one of said first and second table rails to position said guide bar at various angles between a lateral direction and a longitudinal direction; and
   an angle rail supported by and extending between said first and second table rails for supporting said guide bar at various angles.

2. An assembly as set forth in claim 1 wherein said bar locator is further defined as a pair of bar locators engaging each of said first and said second table rails and being slideable along said table rails.

3. An assembly as set forth in claim 2 wherein one of said bar locators engages one of said first and said second table rails and the other of said bar locators engages said angle rail for cutting the material at various angles.

4. An assembly as set forth in claim 2 further comprising a third bar locator engaging said angle rail such that said guide bar engages one of said pair of bar locators and said third bar locator.

5. An assembly as set forth in claim 4 further comprising posts extending upwardly from said bar locators for engaging and securing said guide bar to said bar locator.

6. An assembly as set forth in claim 5 further comprising a locking mechanism engaging each of said bar locators for locking the position of said bar locators.

7. An assembly as set forth in claim 6 further comprising angle indicators on at least one of said first and said second table rails, said saw rail, and said angle rail for positioning said bar locators to achieve a desired angle of cut in the material.

8. An assembly as set forth in claim 7 wherein each of said first and said second table rails and said angle rail further include a slot for receiving said bar locators.

9. An assembly as set forth in claims 1 wherein said first and said second table rails are further defined as having a channel for receiving said saw rail with said saw rail supported by said channel.

10. An assembly as set forth in claim 9 wherein said saw rail is further defined as a pair of saw rails.

11. An assembly as set forth in claim 10 wherein said pair of saw rails is slideably received within said channel of said first and said second table rails.

12. An assembly as set forth in claim 11 wherein said pair of saw rails is removeable from said channel of said first and said second table rails.

13. An assembly as set forth in claim 1 further comprising a plate clamp to clamp said mounting plate and to prevent lateral motion of said mounting plate while moving said saw rail longitudinally.

14. An assembly as set forth in claim 1 further comprising a latch mechanism to secure said saw plate at an angle and to prevent said saw plate from rotating.

15. An assembly as set forth in claim 1 wherein said guide bar further defines a groove for engaging said saw plate.

16. An assembly as set forth in claim 15 wherein said saw plate further comprises a connector for engaging said groove of said guide bar to move said saw plate diagonally.

17. A portable saw table assembly for cutting a material longitudinally, laterally, and at various angles thereto, said assembly comprising:
   a first table rail and a second table rail being parallel and spaced from each other and each extending between a proximal end and a distal end;
   a saw rail moveably supported by said first and said second table rails for moving along said table rails between said proximal and said distal ends;
   a mounting plate moveably supported by said saw rail to move said mounting plate laterally along said saw rail between said first table rail and said second table rail;
   a saw plate supported by said mounting plate for carrying a saw to cut the material;
   a guide bar disposed diagonally relative to said first and said second table rails and guiding said saw plate diagonally in response to simultaneous movement of said saw rail and said mounting plate;
   a bar locator supported by said first and second table rails and engaging said guide bar to position said guide bar diagonally;
   wherein said bar locator is moveable relative to said first and second table rails to position said guide bar at various angles between a lateral direction and a longitudinal direction; and
   an angle rail supported by and extending between said first and second table rails for supporting said guide bar at various angles.

18. An assembly as set forth in claim 17 wherein said bar locator is further defined as a pair of bar locators engaging each of said first and said second table rails and being slideable along said table rails.

19. An assembly as set forth in claim 18 wherein one of said bar locators engages one of said first and said second table rails and the other of said bar locators engages said angle rail for cutting the material at various angles.

20. An assembly as set forth in claim 18 further comprising a third bar locator engaging said angle rail such that said guide bar engages one of said pair of bar locators and said third bar locator.

21. An assembly as set forth in claims 17 wherein said first and said second table rails are further defined as having a channel for receiving said saw rail with said saw rail supported by said channel.

22. An assembly as set forth in claim 17 further comprising a latch mechanism to secure said saw plate at an angle and to prevent said saw plate from rotating.

* * * * *